March 21, 1939. H. E. HOLLMANN 2,151,323
RADIO APPARATUS FOR DETERMINING DISTANCE AND DIRECTION
Filed May 23, 1936
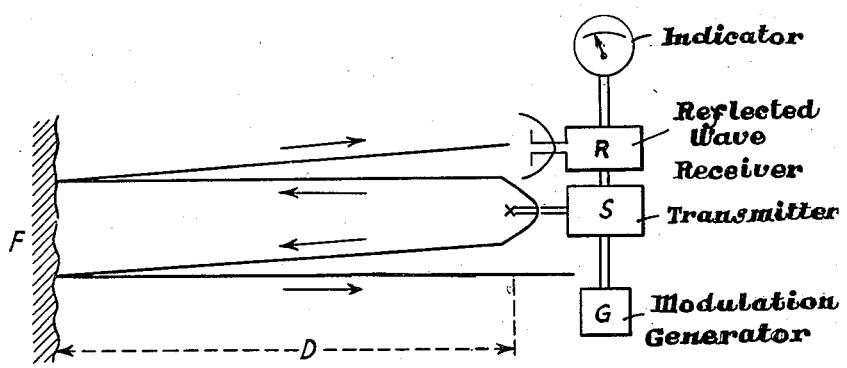
INVENTOR
HANS ERICH HOLLMANN
BY
ATTORNEY Patented Mar. 21, 1939

2,151,323

UNITED STATES PATENT OFFICE 2,151,323

RADIO APPARATUS FOR DETERMINING DISTANCE AND DIRECTION

Hans Erich Hollmann, Berlin, Germany, assignor to Telefunken Gesellschaft für Drahtlose Telegraphie m. b. H., Berlin, Germany, a corporation of Germany Application May 23, 1936, Serial No. 81,357 In Germany May 18, 1935

2 Claims. (Cl. 250—1)

This invention relates to apparatus and a method for measuring distance and for indicating direction by means of ultra-short waves. The invention may be used as an altimeter as well as for horizontal measurements of distance.

In order to determine the distance between a reflecting object or a reflecting surface and a transmitter sending out electrical waves, various methods have been developed. Principally these methods are based upon the fact that standing waves of the radiated carrier oscillations are produced between transmitter and place of reflection, and which are observed either in a controlling receiver or in the transmitter proper, and whereby through variation of the carrier wave the number of nodes of the standing waves which must be known for the distance measurement, is ascertained, or according to another method, the time for a pulse radiated by the transmitter, to pass to the place of reflection and back to a control receiver is measured, or compared as regards phase with a second pulse directly sent to the receiver from the transmitter across an artificial reference base. As high-frequency carriers, ultra-short waves are particularly suited, since they afford the sharpest concentration in the direction upon the place of reflection, while they are highly reflected at the same time also by smaller objects such as airplanes for instance. In practice, the first-mentioned method becomes the more difficult, the shorter the wave chosen, since the distance measurement is directly reduced to a wave measurement but according to the present state of the art such wave measurement cannot be carried out at extremely high frequencies with the necessary accuracy. Since the distances to be measured are of the order of a large multiple of the length of ultra-short waves, the absolute error in the measurement is great.

The present invention provides means to overcome these difficulties in that it is based upon the teaching that an ultra-short wave modulated with a longer intermediate wave behaves in certain respects in such a manner as if only the longer intermediate wave were present, with the exception that the conditions of propagation as regards absorption and reflection are those of the ultra-short carrier wave. With the present invention, therefore, all methods of determining vertical distances which hitherto were based upon a variation of the measuring wave can be applied to intermediately modulated waves whenever in place of the carrier frequency, the modulation frequency is set in such manner that "standing modulation waves" are produced. In this case, the number of nodes can be determined with by far greater accuracy, since in the first place the number of waves contained in a given distance is much smaller. Hence there are fewer nodes than when shorter waves are used. Secondly, lower frequencies can be measured with much greater accuracy than would be possible in the ultra-short wave range.

The application of the idea of the invention will now be further explained with reference to a practical example shown in the drawing. The embodiment therein shown includes an ultra-short wave transmitter S equipped with a directional beam radiator. The propagated beam impinges on the reflecting surface F and is reflected back to a receiver R adjacent the transmitter. The ultra-short wave transmitter is modulated by a second high-frequency generator G having a constant amplitude but variable and exactly adjustable as to frequency. Then, it is obviously possible to choose such modulation frequencies M that a phase displacement of 180° or 360° will be obtained between a modulation oscillation passing towards F and one returning from F. In the first case, a returning modulation maximum i. e. a peak value of the enveloping curve of the modulated high-frequency oscillation always coincides with a minimum sent out, and the two opposite pulses completely compensate each other. In the second case, modulation oscillations of equal phase meet each other consistently so that the sum thereof will be obtained. Whereas in the first case the field strength is diminished in the vicinity of the transmitter or at the transmitter proper, in the second case, a maximum of field strength will be noted. A reflected wave receiver is accordingly provided adjacent the transmitter so that these fluctuations in the field intensity can now be observed. Connected with the receiver is an indicator which is made responsive to the received signals. Direct connections are also made between the transmitter and the receiver such that the grid potential applied to a rectifier in the receiver is under control of the outgoing signals. This provides an unstable adjustment of the rectifier in the receiver, which, however, produces a coordination between the outgoing and incoming signalling energy whereby the occurrence of standing waves may be observed in the indicator.

To ascertain the distance D, two known modulation frequencies $M_1$ and $M_2$ are chosen as limits of gradual variation of the modulation frequency M. Two successive maxima or minima may then be observed. It is obvious that the phase displacement appearing between the two frequencies $M_1$ and $M_2$ is 360° or a multiple thereof, namely 360 $n$ degrees, where $n$ designates the whole number series. Since the speed of the modulation pulses propagating together with the ultra-short wave carrier, is equal to the speed of light $c$, the time difference $dt$ between a modulation pulse emanating from the transmitter and one returning to the transmitter, will be:

$$dt = 2\frac{D}{c} \quad (1)$$

Now, if such modulation pulses follow each other continuously, maxima or minima will always be obtained when this time corresponds to multiples of the modulation cycle $1/M$, therefor:

$$2\frac{D}{c} = \frac{n}{M} \quad (2)$$

or when introducing $M_1$ and $M_2$:

$$2\frac{D}{c} = \frac{n_1}{M_1} = \frac{n_2}{M_2} \quad (3)$$

When assuming that the tuning is adjusted to two successive maxima or minima, then there exists the following relationship between $n_1$ and $n_2$:

$$n_2 = n_1 + 1 \quad (4)$$

From Equations 3 and 4 it is apparent that $$\frac{M_2 n_1}{M_1} = n_1 + 1 \quad (5)$$

whence:

$$\frac{M_2}{M_1} - 1 = \frac{1}{n_1} \quad (6)$$

and $$n_1 = \frac{1}{\frac{M_2}{M_1} - 1} \quad (7)$$

Also from Equation 3 we have $$D = \frac{c n_1}{2 M_1} \quad (8)$$

in which we may employ the right hand term of Equation 7 to obtain:

$$D = \frac{c}{2(M_2 - M_1)} \quad (9)$$

Furthermore, in expressing the modulation frequencies $M$ by the modulation waves $\lambda = c/M$ there is finally:

$$D = \frac{\lambda_1 \lambda_2}{2(\lambda_1 - \lambda_2)} \quad (10)$$

But this is the formula obtained when in place of the modulation frequency, the ultra-short wave carrier frequency is directly varied, and the adjustment is carried out to the effect of producing standing ultra-short waves. Thus, it is proven that by means of the present invention "standing modulation waves" can in fact be produced and which as compared with the standing ultra-short waves have the aforementioned practical advantages of a greater accuracy in the measurement. This accuracy may be still further increased if instead of starting with two successive maxima or minima, the different maxima or minima are chosen in accordance with the order number $N$. The distance $D$ to be determined is then:

$$D = \frac{N \lambda_1 \lambda_2}{2(\lambda_1 - \lambda_2)} \quad (11)$$

What is claimed is:

1. The method of measuring the distance between a point of emanation of an ultra-high frequency wave modulated by a low frequency wave and a point of reflection of said modulated wave, which comprises, producing an ultra-high frequency carrier wave of fixed frequency and a low frequency wave variable in frequency between two limiting values, modulating said carrier wave by said low frequency wave, directively transmitting the resulting modulated carrier wave from said point of emanation to said point of reflection, varying the frequency of the low-frequency wave between said two limiting values so as to produce a standing wave as a result of the interaction between the transmitted wave and the reflected wave, receiving the energy of the standing wave adjacent the point of emanation, indicating the intensity of such energy, and indicating the wavelengths at the two limiting values of the low frequency wave, whereby the distance is indicated as a function of the least common multiple of said wave lengths at the two limiting values.

2. Apparatus for measuring the distance between a point of emanation of an ultra-high frequency wave and a point of reflection of said wave, comprising means for generating and transmitting said ultra-high frequency wave, means for modulating said wave with a low frequency wave variable in frequency between two limiting values, means including a receiving circuit adjacent the point of emanation of said modulated wave for combining the directly propagated wave with the reflected wave, an indicator responsive to the energy of the combined waves, and means operative to correlate the observed indicator responses with a measure of the low frequency wave lengths, whereby the said distance is indicated as a function of the least common multiple of two such wave lengths of said limiting values which are observed to produce a maximum indicator response.

HANS ERICH HOLLMANN.